(12) United States Patent
Kim

(10) Patent No.: US 9,958,157 B2
(45) Date of Patent: May 1, 2018

(54) BURNER HAVING FUEL CONTROL PART

(71) Applicant: KOVEA CO., LTD., Bucheon-si (KR)

(72) Inventor: Sang Hyun Kim, Incheon (KR)

(73) Assignee: KOVEA CO., LTD., Bucheon-si (KR)

( * ) Notice: Subject to any disclaimer, the term of this patent is extended or adjusted under 35 U.S.C. 154(b) by 476 days.

(21) Appl. No.: 14/615,624

(22) Filed: Feb. 6, 2015

(65) Prior Publication Data

US 2015/0226437 A1    Aug. 13, 2015

(30) Foreign Application Priority Data

Feb. 10, 2014 (KR) .................. 10-2014-0014676
Feb. 10, 2014 (KR) .................. 10-2014-0014677
Dec. 19, 2014 (KR) .................. 10-2014-0184207

(51) Int. Cl.
| | | |
|---|---|---|
| F23N 1/00 | (2006.01) | |
| F24C 3/12 | (2006.01) | |
| G05D 16/06 | (2006.01) | |
| F24C 3/14 | (2006.01) | |

(52) U.S. Cl.
CPC ............ F23N 1/007 (2013.01); F24C 3/12 (2013.01); G05D 16/0658 (2013.01); *F23K 2900/05002* (2013.01); *F23N 2035/20* (2013.01); *F23N 2035/24* (2013.01); *F24C 3/14* (2013.01); *Y10T 137/7924* (2015.04)

(58) Field of Classification Search
CPC .............................................. Y10T 137/7924
USPC ....................................................... 126/25 R
See application file for complete search history.

(56) References Cited

U.S. PATENT DOCUMENTS

| | | | | |
|---|---|---|---|---|
| 4,749,005 A | * | 6/1988 | Bergquist | .................. F24C 3/12 137/505.39 |
| 5,988,215 A | * | 11/1999 | Martin | .................... F23N 1/007 137/505.41 |
| 6,042,368 A | * | 3/2000 | Champion | .............. F23D 14/28 137/505.39 |
| 6,748,932 B1 | * | 6/2004 | Sorter | ..................... F02B 43/10 123/527 |
| 6,886,581 B2 | * | 5/2005 | Harniet | ................... F23K 5/007 137/66 |

(Continued)

FOREIGN PATENT DOCUMENTS

| | | |
|---|---|---|
| CN | 2113428 | 8/1992 |
| CN | 201680019 | 12/2010 |

(Continued)

*Primary Examiner* — David J Laux
(74) *Attorney, Agent, or Firm* — Cantor Colburn LLP

(57) ABSTRACT

A burner includes: an adaptor to which a fuel supply box for supplying fuel is connected, and having a fuel inlet; a combustion part configured to perform combustion while fuel injected from the fuel inlet is discharged through a flow path; a connection housing disposed between the adaptor and the combustion part, having a fuel supply path communicated with the fuel inlet, and configured to feed fuel of the fuel supply box to the combustion part; an inflow fuel control part provided at one side of the connection housing, and configured to control the amount of fuel injected by controlling an open degree of the fuel inlet; and a feed fuel control part provided at another side of the connection housing, and configured to control the amount of fuel supplied to the combustion part by controlling an open degree of one side of the fuel supply path.

2 Claims, 6 Drawing Sheets

(56) References Cited

U.S. PATENT DOCUMENTS

| | | | |
|---|---|---|---|
| 6,941,962 B2 * | 9/2005 | Haddad | F02M 13/08 137/1 |
| 2013/0098349 A1 * | 4/2013 | Deng | F23C 1/08 126/58 |

FOREIGN PATENT DOCUMENTS

| | | |
|---|---|---|
| JP | 57070565 | 4/1982 |
| JP | 1993090099 | 12/1993 |
| JP | 1996261471 | 10/1996 |
| JP | 1999344216 | 12/1999 |
| JP | 2002081637 | 3/2002 |
| JP | 2004028381 | 1/2004 |
| KR | 1020030008259 | 1/2003 |
| KR | 1020080072665 | 8/2008 |
| KR | 1020110085442 | 7/2011 |
| TW | 400936 | 8/2000 |
| TW | M439762 | 10/2012 |

\* cited by examiner

BURNER HAVING FUEL CONTROL PART

BACKGROUND OF THE INVENTION

1. Field of the Invention

This specification relates to a burner, and more particularly, to a burner having a fuel control part capable of stably combusting flame.

2. Background of the Invention

In case of the conventional burner for cooking, etc. outdoors, fuel accommodated in a fuel supply box in a compressed state is discharged to outside, and the discharged fuel is combusted, thereby obtaining a heat source required for cooking. In this case, strength of the heat source is controlled according to a cooked state of an object to be heated, for stable cooking.

For this, a control lever is provided at one side of the burner. As the control lever is rotated, strength of the heat source is controlled. However, if a small amount of fuel is filled due to long usage of a fuel supply box, the fuel is not stably supplied. This may cause red flame due to incomplete combustion.

Further, if an excessive amount of fuel is supplied to a combustion part, large flame is instantaneously generated. This may cause a user to burn himself or herself while cooking food, or may cause food to boil over instantaneously, resulting in user's inconvenience.

Recently, a burner which can be used conveniently and stably by overcoming such conventional problems is required.

SUMMARY OF THE INVENTION

Therefore, an aspect of the detailed description is to provide a burner having a fuel control part, capable of enhancing a user's convenience by enhancing stability of flame ignition, through micro-control such that fuel supplied from a fuel supply part is discharged to a combustion part in a constant and uniform manner.

The purpose of the present invention may not be limited to the burner, but may be applicable to various types of camping devices such as a lantern and an insect exterminating device.

The purposes of the present invention may not be limited to the aforementioned purpose, and other purposes not mentioned may be explicitly understood by those skilled in the art from the following descriptions.

To achieve these and other advantages and in accordance with the purpose of this specification, as embodied and broadly described herein, there is provided a burner having a fuel control part, including: an adaptor to which a fuel supply box for supplying fuel is connected, and having a fuel inlet; a combustion part configured to perform combustion while fuel injected from the fuel inlet is discharged through a flow path; a connection housing disposed between the adaptor and the combustion part, having a fuel supply path communicated with the fuel inlet, and configured to feed fuel of the fuel supply box to the combustion part; an inflow fuel control part provided at one side of the connection housing, and configured to control the amount of fuel injected by controlling an open degree of the fuel inlet; and a feed fuel control part provided at another side of the connection housing, and configured to control the amount of fuel supplied to the combustion part by controlling an open degree of one side of the fuel supply path.

The inflow fuel control part may include a coupling member protruding toward one side of the connection housing, and forming a communication space part having one side communicated with the fuel inlet and having another side communicated with the fuel supply path; and a spindle accommodated in the communication space part by being coupled to the coupling member, and having an end portion which controls an open degree of one side of the communication space part communicated with the fuel supply path.

The feed fuel control part may include a pressure interworking valve composed of a pressing part which moves to one side when pressure of feed fuel is applied such that the amount of fuel supplied to the combustion part from the fuel supply box is controlled according to the pressure of feed fuel, and a head part extending from the pressing part, disposed at one side of the fuel supply path, and configured to control an open degree of the fuel supply path as the pressing part moves; and a regulator having a return spring for returning the pressure interworking valve to an initial position when the pressure is released.

The inflow fuel control part may include a pressure interworking valve composed of a pressing part which moves to one side when pressure of feed fuel is applied such that the amount of fuel supplied to the combustion part from the fuel supply box is controlled according to the pressure of feed fuel, and a head part extending from the pressing part, disposed at one side of the fuel supply path, and configured to control an open degree of the fuel supply path as the pressing part moves; and a regulator having a return spring for returning the pressure interworking valve to an initial position when the pressure is released.

The feed fuel control part may include a coupling member protruding toward one side of the connection housing, and forming a communication space part having one side communicated with the fuel inlet and having another side communicated with the fuel supply path; and a spindle accommodated in the communication space part by being coupled to the coupling member, and having an end portion which controls an open degree of one side of the communication space part communicated with the fuel supply path.

When the fuel supply box is coupled to the adaptor, gas fuel accommodated in the fuel supply box may be discharged out.

A plurality of plate parts for mounting an object to be heated may be radially arranged on a circumferential region of the combustion part.

As aforementioned, the burner having a fuel control part can enhance a user's convenience by enhancing stability of flame ignition, through micro-control such that fuel supplied from a fuel supply part is discharged to a combustion part in a constant and uniform manner.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, a burner having a fuel control part according to an embodiment of the present invention will be explained in more detail with reference to the attached drawings.

Figure 1:
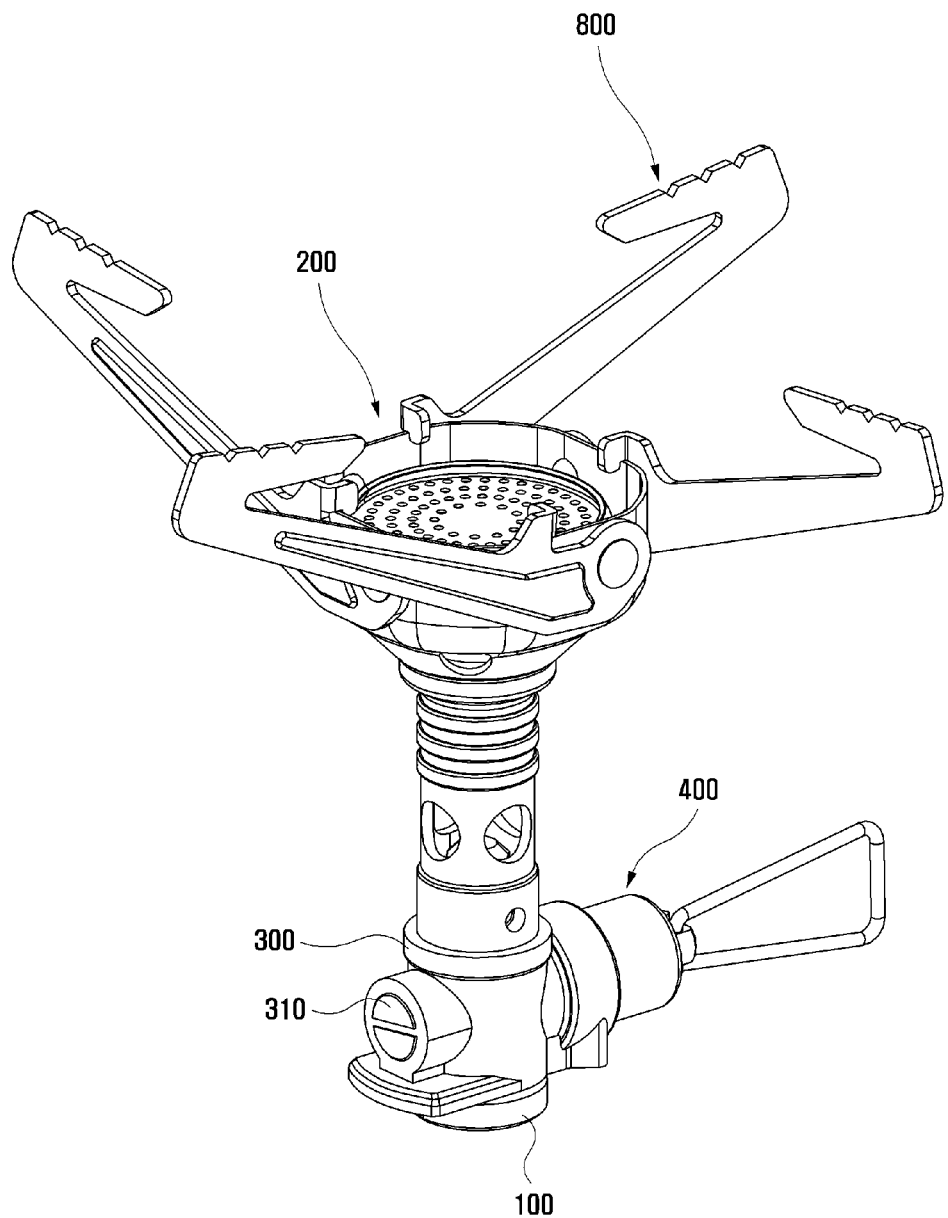
FIG. 1 is a perspective view illustrating a structure of a burner having a fuel control part according to an embodiment of the present invention.
Figure 2:
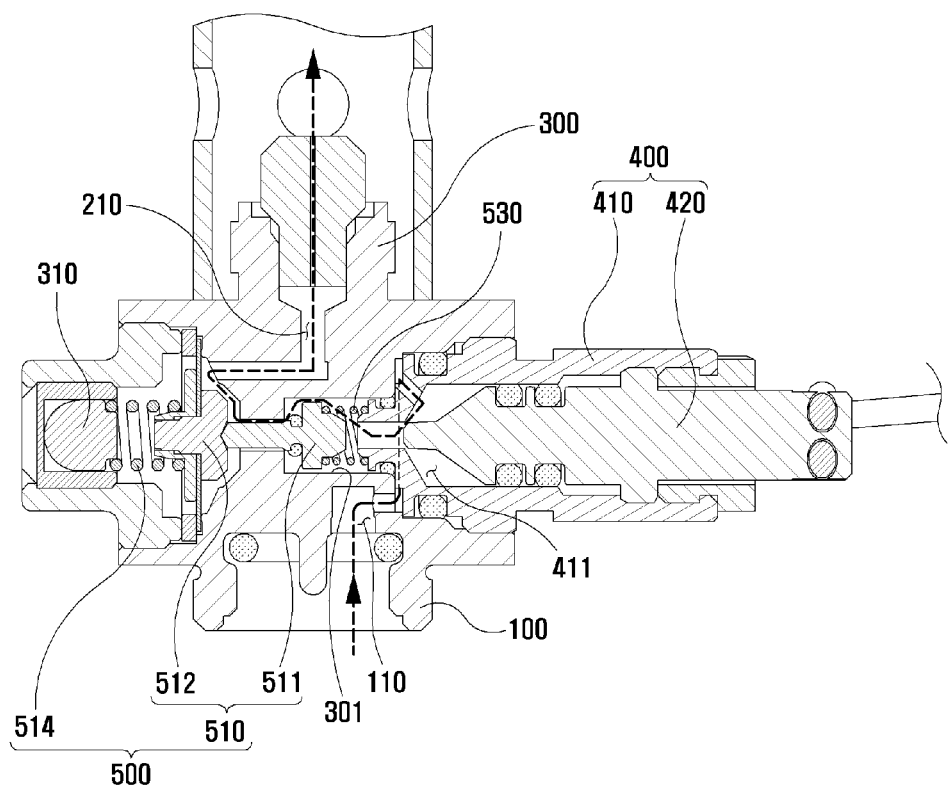
FIG. 2 is a perspective view illustrating a longitudinal sectional structure of a burner having a fuel control part according to an embodiment of the present invention.
Figure 3:
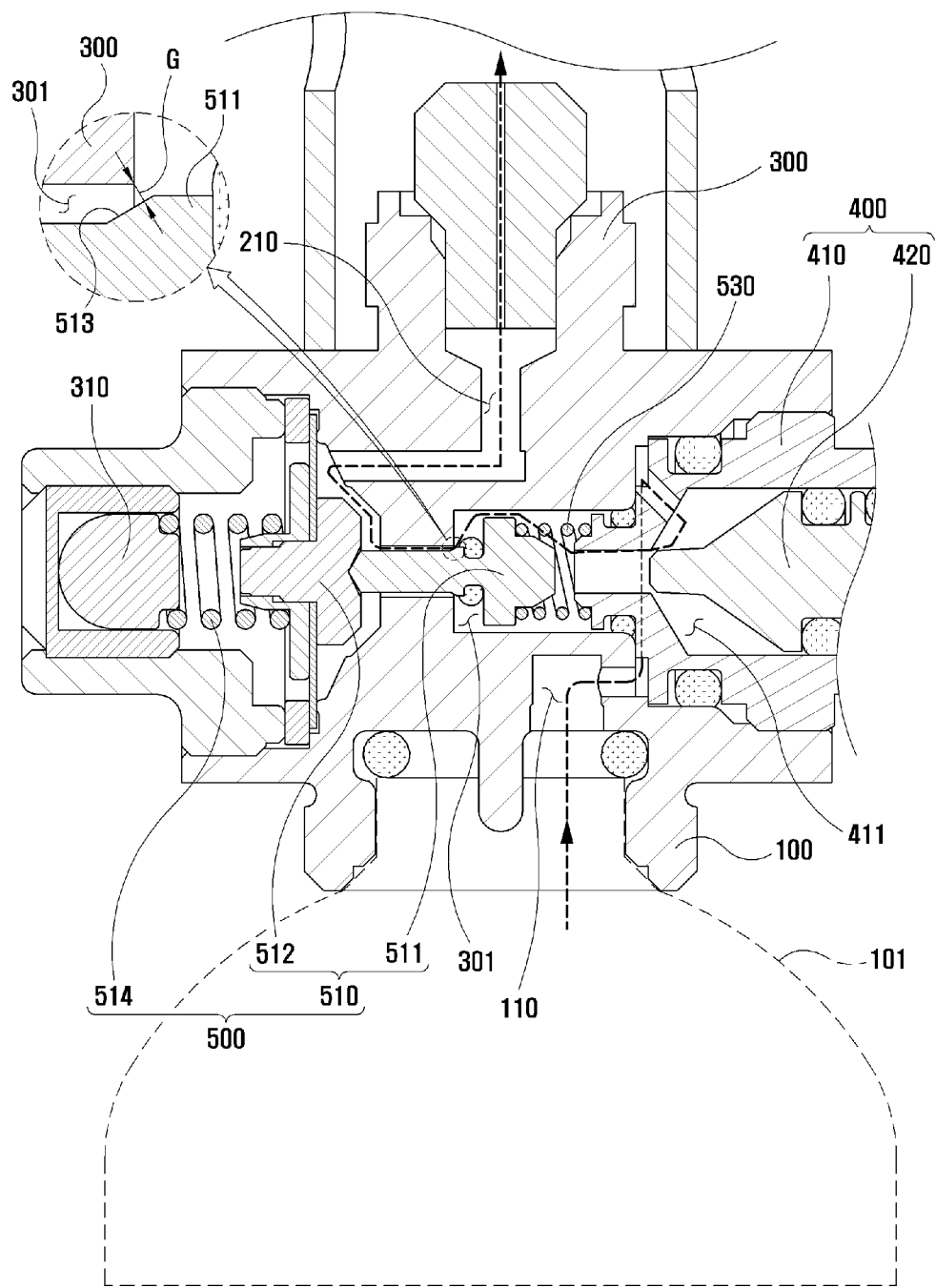
FIG. 3 is an enlarged view illustrating a feed fuel control part and an inflow fuel control part according to an embodiment of the present invention.

FIG. 1 is a perspective view illustrating a structure of a burner having a fuel control part according to an embodiment of the present invention, FIG. 2 is a perspective view illustrating a longitudinal sectional structure of a burner having a fuel control part according to an embodiment of the present invention, and FIG. 3 is an enlarged view illustrating a feed fuel control part and an inflow fuel control part according to an embodiment of the present invention.

As shown, the burner having a fuel control part according to an embodiment of the present invention includes an adaptor 100 to which a fuel supply box 101 for supplying fuel is connected, and having a fuel inlet 110; a combustion part 200 configured to perform combustion while fuel injected from the fuel inlet 110 is discharged through a flow path 210; a connection housing 300 disposed between the adaptor 100 and the combustion part 200, having a fuel supply path 301 communicated with the fuel inlet 110, and configured to feed fuel of the fuel supply box 101 to the combustion part 200; an inflow fuel control part 400 provided at one side of the connection housing 300, and configured to control the amount of fuel injected by controlling an open degree of the fuel inlet 110; and a feed fuel control part 500 provided at another side of the connection housing 300, and configured to control the amount of fuel supplied to the combustion part 200 by controlling an open degree of one side of the fuel supply path 301.

The adaptor 100 is a member having therein the fuel inlet 110 for combustion by supplying fuel accommodated in the fuel supply box 101 to the combustion part 200 through the inflow fuel control part 400.

The fuel supply box 101 is a cylindrical member. One end of the fuel supply box 101 is coupled to the adaptor 100 to thus press a nozzle provided at the fuel supply box 101, such that gas fuel accommodated in the fuel supply box 101 is injected through the fuel inlet 110.

The combustion part 200 is a member to perform combustion substantially using fuel supplied from the fuel supply box 101. In the combustion part 200, there is an additional flow path communicated with the fuel supply path of the connection housing 300.

The connection housing 300 is a member disposed between the adaptor 100 and the combustion part 200 and configured to connect the adaptor 100 and the combustion part 200 to each other. The connection housing 300 has therein the fuel supply path 301 having one end communicated with one side of the fuel inlet 110, and another end communicated with the flow path of the combustion part 200.

The inflow fuel control part 400 is configured to control an inflow amount of fuel supplied from the fuel supply box 101, through the fuel inlet 110. The inflow fuel control part 400 controls the inflow amount of fuel arbitrarily according to a user's need.

As shown in FIGS. 1 to 3, the inflow fuel control part 400 of the burner having a fuel control part according to an embodiment of the present invention may include a coupling member 410 protruding toward one side of the connection housing 300, and forming a communication space part 411 having one end communicated with the fuel inlet 110 and having another end communicated with the fuel supply path 301; and a spindle 420 accommodated in the communication space part 411 by being coupled to the coupling member 410, and having an end portion which controls an open degree of one side of the communication space part 411 communicated with the fuel supply path 301.

As the spindle 420 accommodated in the communication space part 411 formed by the coupling member 410 is rotated, an inserted depth of the end of the spindle 420 into one side of the fuel inlet 110 is controlled. As a result, an open degree of the fuel inlet 110 is controlled, so that the amount of inflow fuel can be controlled.

The end of the spindle 420 inserted into one side of the fuel inlet 110 has its side surfaces tapered. Under such a configuration, an open degree is controlled according to a distance between the fuel inlet 110 and the tapered side surfaces of the end of the spindle 420.

That is, when a distance between the fuel inlet 110 and the side surfaces of the end of the spindle 420 is short, an open degree is small. As a result, the amount of fuel injected through the fuel inlet 110 is decreased. On the other hand, when a distance between the fuel inlet 110 and the side surfaces of the end of the spindle 420 is long, an open degree is large. As a result, the amount of fuel injected through the fuel inlet 110 is increased.

The feed fuel control part 500 of the burner having a fuel control part according to an embodiment of the present invention may include a pressure interworking valve 510 composed of a pressing part 512 which moves to one side when pressure of feed fuel is applied such that the amount of fuel supplied to the combustion part 200 from the fuel supply box 101 is controlled according to the pressure of feed fuel, and a head part 511 extending from the pressing part 512, disposed at one side of the fuel supply path 301, and configured to control an open degree of the fuel supply path 301 as the pressing part 512 moves; and a regulator having a return spring 514 for returning the pressure interworking valve 510 to the original position when the pressure is released.

The pressure interworking valve 510 is movably disposed on the fuel supply path 301 of the connection housing 300, which is a member configured to control an open degree of the fuel supply path 301 by the head part 511 according to a pressure of fuel having passed through the fuel inlet 110.

A tapered part 513, having a diameter gradually decreased toward a lower side, is formed on a circumferential surface of a lower side of the head part 511. Under such a configuration, an open degree is controlled according to a size of a gap (G) formed between an entrance of the fuel supply path 301 and the tapered part 513.

An external surface of the head part 511 of the pressure interworking valve 510 is formed to be curved, and the pressing part 512 is formed to be flat.

Preferably, a valve contact spring 530 is additionally installed between an external surface of the head part 511 and an external surface of the coupling member 410, for rapid movement of the head part 511.

The return spring 514 for returning the pressure interworking valve 510 to the original position is provided on an external surface of the pressing part 512, an opposite side to the valve contact spring 530. As an external surface of the returning spring 514 comes in contact with an elastic control knob 310 coupled to the connection housing 300, elasticity of the returning spring 514 may be controlled by the elastic control knob 310.

Figure 4:
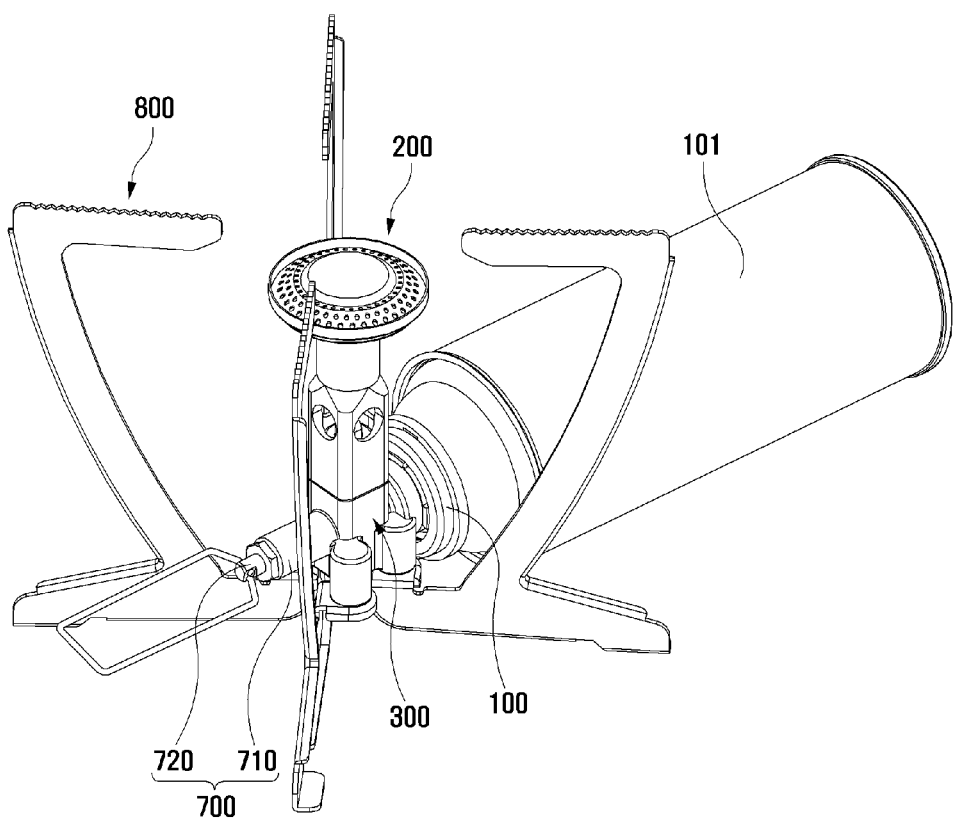
FIG. 4 is a perspective view illustrating a structure of a burner having a fuel control part according to another embodiment of the present invention.
Figure 5:
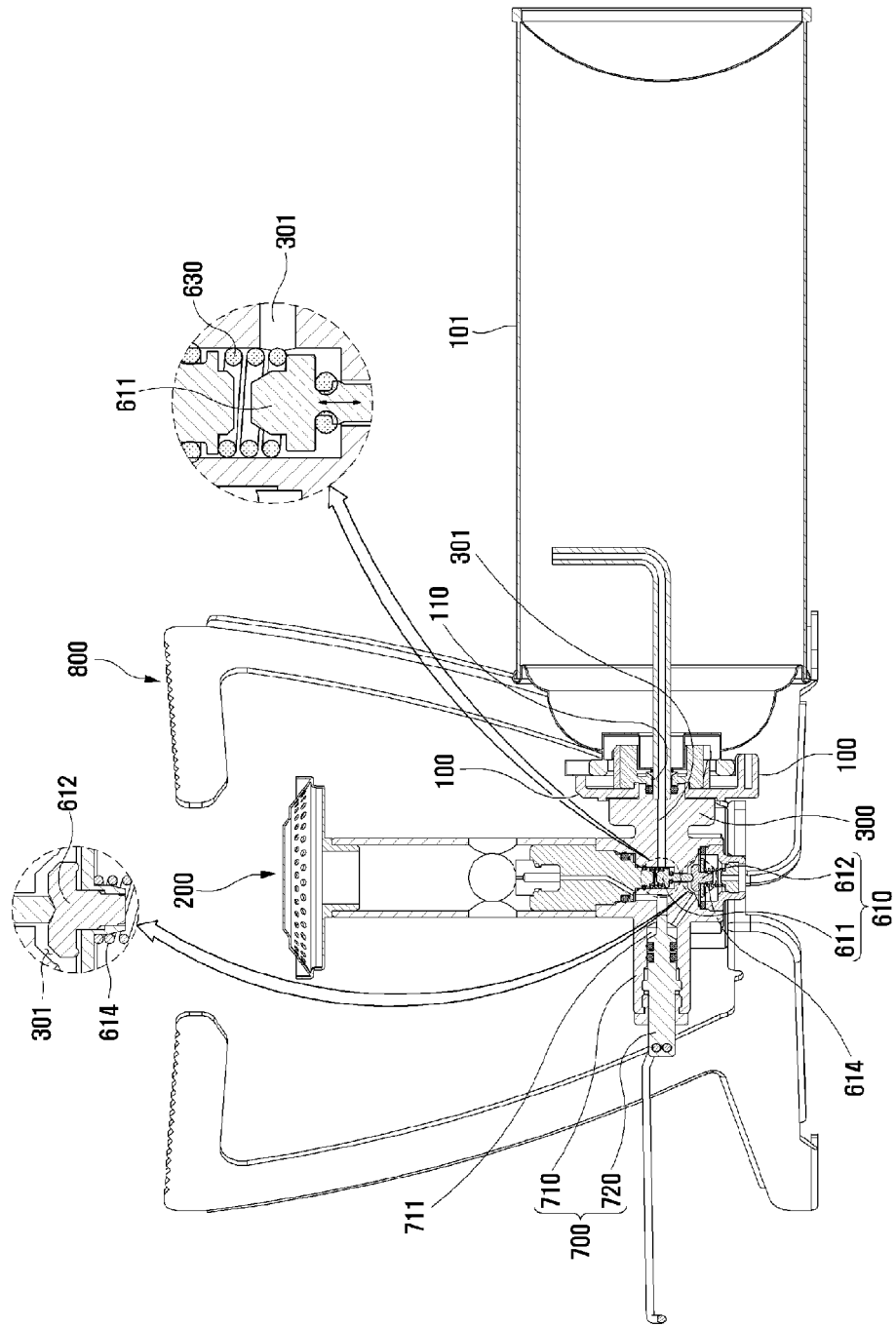
FIG. 5 is a perspective view illustrating a longitudinal sectional structure of a burner having a fuel control part according to another embodiment of the present invention.
Figure 6:
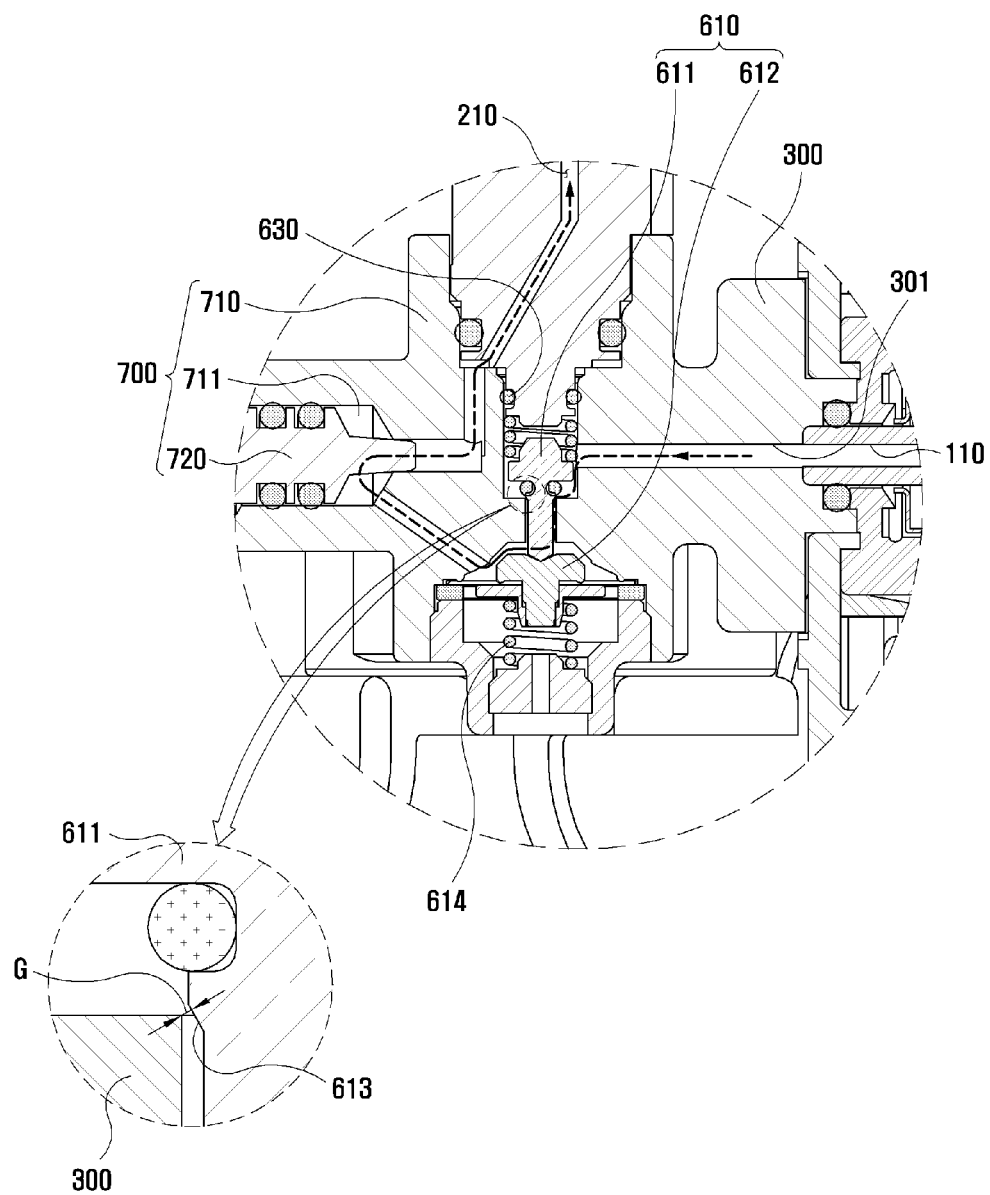
FIG. 6 is an enlarged view illustrating a feed fuel control part and an inflow fuel control part according to another embodiment of the present invention.

FIG. 4 is a perspective view illustrating a structure of a burner having a fuel control part according to another embodiment of the present invention. FIG. 5 is a perspective view illustrating a longitudinal sectional structure of a burner having a fuel control part according to another embodiment of the present invention. FIG. 6 is an enlarged view illustrating a feed fuel control part and an inflow fuel control part according to another embodiment of the present invention.

As shown in FIGS. 4 to 6, the burner having a fuel control part according to another embodiment of the present invention includes an adaptor 100 to which a fuel supply box 101 for supplying fuel is connected, and having a fuel inlet 110; a combustion part 200 configured to perform combustion while fuel injected from the fuel inlet 110 is discharged through a flow path 210; a connection housing 300 disposed between the adaptor 100 and the combustion part 200, having a fuel supply path communicated with the fuel inlet 110, and configured to feed fuel of the fuel supply box 101 to the combustion part 200; an inflow fuel control part 600 provided at one side of the connection housing 300, and configured to control the amount of inflow fuel by controlling an open degree of the fuel inlet 110; and a feed fuel control part 700 provided at another side of the connection housing 300, and configured to control the amount of fuel supplied to the combustion part 200 by controlling an open degree of one side of the fuel supply path 301.

The same components of the burner having a fuel control part according to another embodiment of the present invention, as those of the burner having a fuel control part according to an embodiment of the present invention will be provided with the same reference numerals, and detailed explanations thereof will be omitted.

The inflow fuel control part 600 of the burner having a fuel control part according to another embodiment of the present invention may include a pressure interworking valve 610 composed of a pressing part 612 which moves to one side when pressure of feed fuel is applied such that the amount of fuel supplied to the combustion part 200 from the fuel supply box 101 is controlled according to the pressure of feed fuel, and a head part 611 extending from the pressing part 612, disposed at one side of the fuel supply path 301, and configured to control an open degree of the fuel supply path 301 as the pressing part 612 moves; and a regulator having a return spring 614 for returning the pressure interworking valve 610 to the original position when the pressure is released.

The pressure interworking valve 610 is movably disposed on the fuel supply path 301 of the connection housing 300, which is a member configured to control an open degree of the fuel supply path 301 by the head part 611 according to a pressure of fuel having passed through the fuel inlet 110.

A tapered part 613, having a diameter gradually decreased toward a lower side, is formed on a circumferential surface of a lower side of the head part 611. Under such a configuration, an open degree is controlled according to a size of a gap (G) formed between an entrance of the fuel supply path 301 and the tapered part 613.

An external surface of the head part 611 of the pressure interworking valve 610 is formed to be curved, and the pressing part 612 is formed to be flat.

Preferably, a valve contact spring 630 is additionally installed between an external surface of the head part 611 and an external surface of a coupling member 710, for rapid movement of the head part 611.

The return spring 614 for returning the pressure interworking valve 610 to the original position is provided on an external surface of the pressing part 612, an opposite side to the valve contact spring 630. As an external surface of the returning spring 614 comes in contact with an elastic control knob 310 coupled to the connection housing 300, elasticity of the returning spring 614 may be controlled by the elastic control knob 310.

The feed fuel control part 700 of the burner having a fuel control part according to another embodiment of the present invention may include a coupling member 710 protruding toward one side of the connection housing 300, and forming a communication space part 711 communicated with the fuel supply path 301 of the connection housing 300; and a spindle 720 accommodated in the communication space part 711 by being coupled to the coupling member 710, and having an end portion which controls an open degree of one side of the communication space part 711 communicated with the fuel supply path 301.

As the spindle 720 accommodated in the communication space part 711 formed by the coupling member 710 is rotated, an inserted depth of the end of the spindle 720 into one side of the fuel inlet 110 is controlled. As a result, an open degree of the fuel inlet 110 is controlled, so that the amount of inflow fuel can be controlled.

The end of the spindle 720 inserted into one side of the fuel inlet 110 has its side surfaces tapered. Under such a configuration, an open degree is controlled according to a distance between the fuel inlet 110 and the tapered side surfaces of the end of the spindle 720.

That is, when a distance between the fuel inlet 110 and the side surfaces of the end of the spindle 720 is short, an open degree is small. As a result, the amount of fuel injected through the fuel inlet 110 is decreased. On the other hand, when a distance between the fuel inlet 110 and the side surfaces of the end of the spindle 720 is long, an open degree is large. As a result, the amount of fuel injected through the fuel inlet 110 is increased.

A plurality of plate parts 800 for mounting an object to be heated are radially arranged on a circumferential region of the combustion part 200.

As the plurality of plate parts 800 are arranged on a circumferential region of the combustion part 200, an object to be heated may be heated in a stable state.

Operational processes of the burner having a fuel control part according to an embodiment of the present invention are as follows. The burner having a fuel control part according to another embodiment of the present invention has the same operational processes as the burner having a fuel control part according to an embodiment of the present invention, and thus detailed explanations thereof will be omitted.

However, in the burner having a fuel control part according to another embodiment of the present invention, the coupling member and the spindle are provided at an outlet where fuel is discharged toward the combustion part, and the regulator is provided at an inlet where fuel passes through the connection housing 300.

First of all, the fuel supply box 101 is connected to the adaptor 100. For this, the fuel supply box 101 is inserted into one side of the adaptor 100. Then, if the fuel supply box 101 is rotated, the rotation of the fuel supply box 101 is stopped by a restriction protrusion provided at one side of the adaptor 100. As a result, the fuel supply box 101 is coupled to the adaptor 100.

As the fuel supply box 101 is coupled to the adaptor 100, fuel accommodated in the fuel supply box 101 is injected into the burner through the fuel inlet 110. Then, the fuel injected into the burner passes through the inflow fuel control part 400 through the fuel supply path 301 of the connection housing 300. Then, the fuel is supplied to the combustion part 200 via the feed fuel control part 500, thereby being used for combustion.

In this case, if gas fuel supplied to the inflow fuel control part 400 has an excessive pressure, the spindle 420 is rotated to decrease a gap between the end of the spindle 420 and the fuel supply path 301, thereby decreasing the amount of fuel to be supplied. On the other hand, if gas fuel supplied to the inflow fuel control part 400 has a low pressure, the spindle 420 is rotated to increase a gap between the end of the spindle 420 and the fuel supply path 301, thereby increasing the amount of fuel to be supplied.

Fuel, which has been injected with a predetermined amount by the inflow fuel control part 400, undergoes control of a supply amount by the feed fuel control part 500. Processes to control the supply amount are as follows. In a case where injected fuel has pressure higher than the atmospheric pressure, if pressure is applied to the pressing part 512, the pressing part 512 is moved to one side due to the pressure applied thereto. While the head part 511 connected to the pressing part 512 moves, one side surface of the head part 511 approaches one side of the fuel supply path 301. Accordingly, a gap (G) between the tapered part 513 and one wall surface of the fuel supply path 301 is decreased, and thus an open degree is reduced. As a result, the amount of fuel supplied to the combustion part 200 through the fuel supply path 301 is reduced.

On the contrary, in a case where injected fuel has pressure lower than the atmospheric pressure, if pressure is applied to the pressing part 512, the pressing part 512 is moved to another side due to the pressure applied thereto. While the head part 511 connected to the pressing part 512 moves, one side surface of the head part 511 approaches one side of the fuel supply path 301. Accordingly, a gap (G) between the tapered part 513 and one wall surface of the fuel supply path 301 is increased, and thus an open degree is increased. As a result, the amount of fuel supplied to the combustion part 200 through the fuel supply path 301 is increased.

As a predetermined amount of fuel is continuously supplied to the combustion part 200 of the burner by operations of the inflow fuel control part 400 and the feed fuel control part 500, a user can use the burner which is combusted stably.

Especially, when pressure applied from the combustion part 200 of the burner is high, the inflow fuel control part 400 or the feed fuel control part 500 interworks with the pressure, thereby controlling the amount of fuel to be injected. As a result, fuel supply can be performed more stably.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A burner having a fuel control part, comprising:
   an adaptor to which a fuel supply box for supplying fuel is connected, and having a fuel inlet;
   a combustion part configured to perform combustion while fuel injected from the fuel inlet is discharged through a flow path;
   a connection housing disposed between the adaptor and the combustion part, having a fuel supply path communicated with the fuel inlet and the flow path and configured to feed fuel of the fuel supply box to the combustion part;
   an inflow fuel control part provided at one side of the connection housing, the inflow fuel control part composed of a coupling member and a spindle being coupled to the coupling member, the coupling member protruding toward one side of the connection housing, and forming a communication space part and the spindle accommodated in the communication space part and having a tapered formed one end inserted in the fuel supply path configured to gradually control an opening degree of the fuel inlet by controlling a distance between the fuel inlet and the spindle, thereby controlling the amount of fuel injected into the fuel supply path; and
   a feed fuel control part provided at another side of the connection housing, the feed fuel control part including a pressure interworking valve composed of a pressing part and a head part extending from the pressing part, a return spring for returning the pressure interworking valve to an initial position when the pressure is released and an elastic control knob connected to one end of the return spring to control elasticity of the return spring, the head part being disposed inside the fuel supply path and having a tapered part formed on a circumferential surface thereof, the tapered part having a diameter gradually decreased toward a fuel flow direction, and the pressure interworking valve being configured to gradually move in the fuel flow direction when a pressure is applied into the fuel supply path by the fuel injected into the fuel supply path and thus control the amount of fuel supplied to the combustion part by controlling an open degree of the fuel supply path by the tapered part.

2. The burner of claim 1, wherein the combustion part includes a plurality of plate parts for an object to be heated to be radially arranged on a circumferential region of the combustion part.

* * * * *